Oct. 28, 1930.  J. L. WARINER  1,780,052
HEATING SYSTEM FOR CHICKEN BROODERS AND POULTRY HOUSES
Filed Feb. 28, 1929
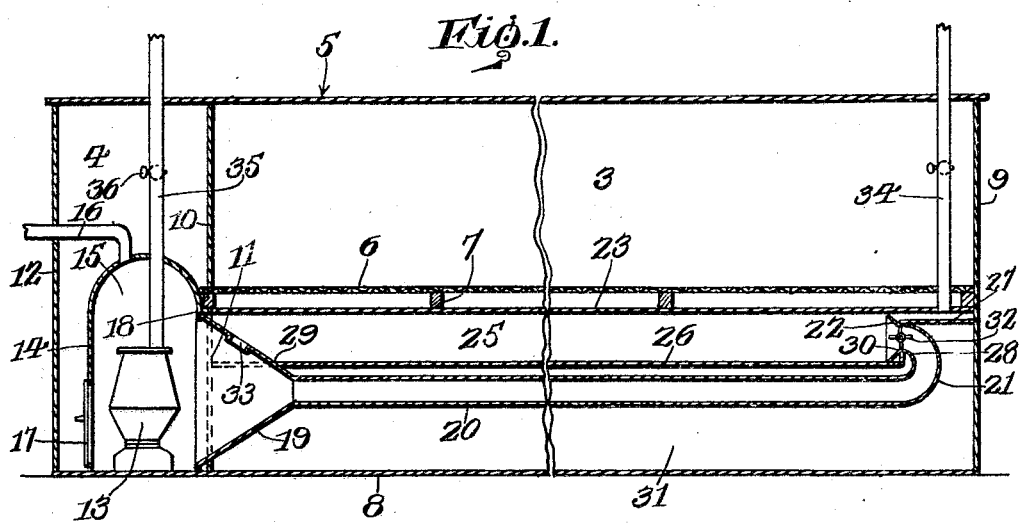
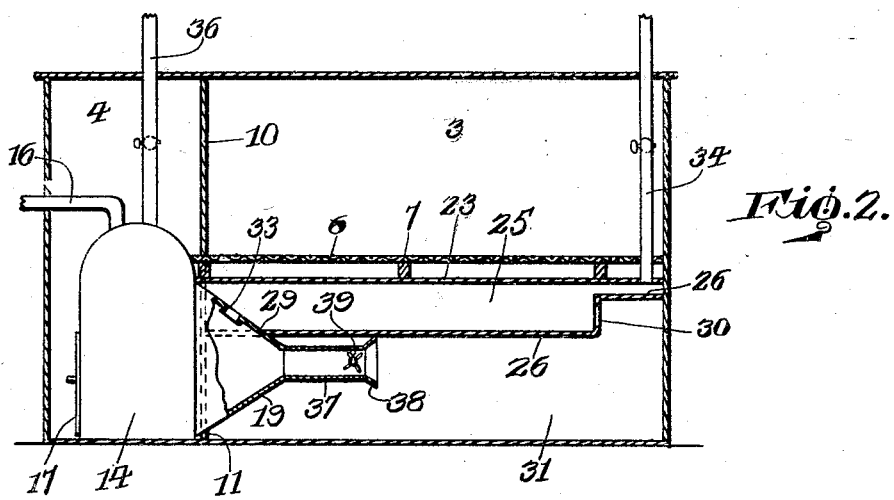
INVENTOR.
J. L. Wariner,
BY Geo. P. Kimmel
ATTORNEY.

Patented Oct. 28, 1930

1,780,052

UNITED STATES PATENT OFFICE

JOSEPH L. WARINER, OF SALEM, OREGON

HEATING SYSTEM FOR CHICKEN BROODERS AND POULTRY HOUSES

Application filed February 28, 1929. Serial No. 343,510.

This invention relates to a heating system designed primarily for use in connection with chicken brooders or poultry houses, but it is to be understood that it may be employed for any purposes for which it is found applicable, and the invention has for its object to provide an improved heating system for brooding baby chicks and heating poultry houses by the circulation of warm air by a forced draft through a heating chamber positioned below a brooding or other chamber.

Further objects of the invention are to provide a heating system for the purpose referred to which is simple in its construction and arrangement, strong, durable, compact, thoroughly efficient, readily installed with respect to a brooder or poultry house, and comparatively inexpensive to maintain.

With the foregoing and other objects in view the invention consists of a novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a fragmentary view in longitudinal section of a brooder showing the adaptation of a heating system in accordance with this invention.

Figure 2 is a longitudinal sectional view of a brooder showing the adaptation of a modified form of heating system in accordance with this invention.

A heating system, in accordance with this invention is illustrated by way of example in connection with a brooder. Two forms of brooders are shown and each includes a brooding chamber 3 and a compartment 4. The difference between the two forms is that the one shown in Figure 1 is of greater capacity resulting in a brooding chamber of materially greater area. The heating system may include one or more heating elements depending upon the size of the brooder and is illustrated by way of example, with but one heating element. When two or more heating elements are used an enclosing casing common thereto may be employed or a single enclosing casing used for each element. When a casing common to two or more heating elements is employed it will be of a length equal to the distance between a pair of opposed walls of the brooder. The heating element or elements is or are arranged in compartment 4. The enclosing casing or casings referred to form part of the inner wall of the compartment 4.

If a single casing, common to a plurality of heating elements is employed the inner side of such casing will form the lower portion of the inner wall of compartment 4. If a single heating element is employed then the lower portion of the inner wall of the compartment 4 includes a lower partition to be presently referred to. If a plurality of heating elements are employed, each having an independent enclosing casing, then the lower portion of the inner wall of compartment 4 will be formed by a lower partition to be presently referred to.

As the brooders illustrated are of like construction, but one will be described as the description of one will apply to the other. Each brooder comprises a rectangular housing 5 having arranged therein a length of reticulated metallic fabric, such as a wire screen forming a flooring 6 secured upon supports or joists 7 positioned a substantial distance above the bottom 8 of housing 5. The flooring 6 provides the bottom of the brooding chamber 3 and extends from the front to the rear wall of the housing and from the end wall 9 of the housing to the inner wall of the compartment 4. It is to be understood however that the flooring 6 can be supported by a frame in lieu of the supports 7. The flooring 6 in connection with said end wall 9, inner wall of compartment 4, top, front and rear walls of housing 5 provides the brooding chamber 3. The housing 5 is provided with suitable means whereby convenient access can be had to chamber 3.

As the heating system is illustrated with the employment of a single heating element, there is arranged in housing 5 a pair of vertically aligning partitions 10, 11 spaced from and in connection with the end wall 12 of housing 5 providing the compartment 4. The partition 10 is positioned upon flooring 6 and the partition 11 below the latter and upon bottom 8. The partition 10 can be reticulated if desired.

The brooders as illustrated by way of example show the adaptation of a heating system, in accordance with this invention for the purpose of providing for the circulation of hot air through a heating chamber arranged below the bottom of a brooding chamber for brooding baby chicks and for heating purposes.

The heating system includes an air heating element 13 of any suitable form, as illustrated a stove and which is positioned in compartment 4 and seats on the bottom 8 of housing 5. The element 13 is arranged adjacent to the flooring 6 and positioned below the supports 7. The element 13 is enclosed by casing 14 having an open bottom and a closed top. The casing 14 is also arranged in compartment 4 and further is positioned in spaced relation with respect to and of greater height than element 13. The bottom of casing 14 is closed by the bottom 8 of housing 5. The casing 14 provides an air receiving chamber 15. Air is supplied to the chamber 15 by a conducting pipe 16 which leads from the atmosphere, extends through end wall 12 of housing 5 and opens into chamber 15 through the top of casing 14. One side of casing 14 is provided with a door 17 so that access can be had to element 13. The opposite side of casing 14 is formed with a cutout portion or opening 18 to the edge of which is secured an inwardly extending, funnel-shaped heated air supply member 19 which opens into a suction pipe 20 formed with an upstanding elbow 21, at that end thereof opposite the end with which the member 19 is connected. The elbow 21 terminates in a flaring outlet 22 which is directed towards the element 13. The casing 14 projects above the flooring 6.

Positioned below, as well as being secured to the supports 7 and housing 5 is a partition 23 which is coextensive with the flooring 6 and provides the top wall of a heating chamber 25 for the brooding chamber 3. The front and rear walls of the chamber 25 may be formed by the front and rear walls of the housing 5 or by wall forming members secured to such housing walls, preferably however, by these latter.

A pair of partitions 26, 27 are positioned below partition 23, and with the partition 26 of greater length than and arranged below partition 27. A partition 28 is arranged between the aligning ends of partitions 26, 27. Partition 26 extends from the inner wall of compartment 4 and has an opening 29 through which extends the upper portion of member 19. Partition 28 is provided with an opening 30 to which the upper end of elbow 21 is connected. The bottom of chamber 25 is formed by partitions 26, 27 and the upper portion of member 19. One of the side walls of the chamber 25 is provided by the inner wall of compartment 4 and the other side wall of chamber 25 is provided by partition 28 and the wall 9 of the housing.

The inner end wall of compartment 3, partitions 26, 27 and 28 form a compartment 31 for the conducting pipe 20.

Arranged within the upper end of the elbow 21 and operated by any suitable means is a suction fan 32 which provides for the circulation of heated or hot air through chamber 25, the air passing from member 19 into pipe 20 and through pipe 20 to elbow 21 and discharging from elbow 21 into chamber 25 and from chamber 25 through opening 13 into member 19.

Leading from chamber 25 and extending through chamber 3 is a valve controlled ventilating pipe 34. Extending from the element 13, through casing 14 and up through compartment 4 is a flue 35 provided with a damper 36.

The modified form shown in Figure 2 is substantially the same as the form shown in Figure 1, with the exception that the conducting pipe 20 does not extend through the opening 30 in the partition 28. In Figure 2 the hot air conducting pipe from member 19 is indicated at 37 and only partly extends through chamber 31. The flared outlet for the pipe 37 is indicated at 38 and which is arranged within chamber 31 below partition 26.

Within the outlet end of the pipe 37 is arranged a suction fan 39 operated by any suitable means and which will provide for the circulation of hot air through the heating chamber 25. Otherwise than that as stated the form shown in Figure 2 is the same as that shown in Figure 1.

When a single heating element is employed, preferably it is positioned centrally with respect to the inner wall of chamber 3. When two or more heating elements are used they are arranged the desired distance apart for efficient action. The housing 5 is provided in a manner so that access can be had to the compartment 4 when desired and also to compartment 31, as well as to chamber 3. The partition 23 is formed of heat conducting material, preferably sheet metal. Partitions 26, 27 and 28 can be formed of any suitable material, as well as conducting pipe 20.

What I claim is:

In a heating system for brooders, the combination with a brooding chamber, of a heating chamber for the brooder chamber arranged below and in close proximity to the bottom of the brooding chamber and substantially coextensive with such bottom, said heating chamber having intake means for hot air, a closed compartment positioned below said heating chamber, an air heating chamber positioned adjacent the brooding and heating chambers and said compartment, the inner wall of said air heating chamber provided with a funnel shaped extension having means for establishing communication between the interior of the extension and said heating chamber and providing a hot air outlet for the latter, a heating element arranged within said air heating chamber, a suction pipe opening into and leading from said funnel-shaped extension, said suction pipe extending through said compartment and opening into said intake means for hot air, said suction pipe positioned below said heating chamber, and a suction device arranged within said suction pipe in proximity to its outlet end for supplying hot air to and circulating it through said heating chamber.

In testimony whereof, I affix my signature hereto.

JOSEPH L. WARINER.